United States Patent
Baumhoff et al.

(10) Patent No.: US 11,719,369 B2
(45) Date of Patent: Aug. 8, 2023

(54) LINE ELEMENT WITH FRICTION-REDUCING LAYER

(71) Applicant: Westfalia Metal Hoses GmbH, Hilchenbach (DE)

(72) Inventors: Dietmar Baumhoff, Olpe (DE); Michael Henkelmann, Hilchenbach (DE); Oliver David Selter, Attendorn (DE); Andreas Gerhard, Wenden (DE); Stefan Hauk, Hilchenbach (DE); Karl-Heinz Münker, Hilchenbach (DE); Karsten Schenk, Schwalmstadt (DE); David Christopher Siebels, Dortmund (DE); Matthias Weiss, Hilchenbach (DE); Sascha Jan Sckudlarek, Freudenberg (DE)

(73) Assignee: WESTFALIA METAL HOSES GMBH, Hilchenbach (DE)

( * ) Notice: Subject to any disclaimer, the term of this patent is extended or adjusted under 35 U.S.C. 154(b) by 85 days.

(21) Appl. No.: 16/964,116

(22) PCT Filed: Jan. 29, 2019

(86) PCT No.: PCT/EP2019/052035
§ 371 (c)(1),
(2) Date: Jul. 22, 2020

(87) PCT Pub. No.: WO2019/149665
PCT Pub. Date: Aug. 8, 2019

(65) Prior Publication Data
US 2021/0033230 A1 Feb. 4, 2021

(30) Foreign Application Priority Data
Jan. 30, 2018 (DE) .................. 10 2018 102 078.3

(51) Int. Cl.
*F16L 27/10* (2006.01)
*F01N 13/18* (2010.01)
(Continued)

(52) U.S. Cl.
CPC ...... *F16L 27/1004* (2013.01); *F01N 13/1816* (2013.01); *F16L 11/16* (2013.01); *F16L 27/11* (2013.01); *F16L 51/025* (2013.01)

(58) Field of Classification Search
CPC ........ F16L 27/1004; F16L 27/11; F16L 11/16; F16L 51/025; F01N 13/1816
(Continued)

(56) References Cited

U.S. PATENT DOCUMENTS 2,099,756 A * 11/1937 Seigle ...................... F16L 9/14
285/55
8,181,672 B2 5/2012 Weiss et al.
(Continued)

FOREIGN PATENT DOCUMENTS

DE 195 31 796 4/1997
DE 297 07 779 8/1997
(Continued)

OTHER PUBLICATIONS

International Search Report issued by the European Patent Office in International Application PCT/EP2019/052035 dated May 16, 2019.

*Primary Examiner* — Craig M Schneider
*Assistant Examiner* — David R Deal
(74) *Attorney, Agent, or Firm* — Henry M. Feiereisen LLC

(57) ABSTRACT

The invention relates to a line element (100) having an inner element (IE), an outer element (AE) surrounding the inner element, and a sliding layer (131, 132) in the form of an anti-friction lacquer, which is arranged in the contact region on the inner element (IE) and/or on the outer element (AE).

12 Claims, 2 Drawing Sheets

(51) Int. Cl.
*F16L 11/16* (2006.01)
*F16L 27/11* (2006.01)
*F16L 51/02* (2006.01)

(58) Field of Classification Search
USPC .................................................. 138/107, 121
See application file for complete search history.

(56) References Cited

U.S. PATENT DOCUMENTS

| | | |
|---|---|---|
| 9,291,263 B2 | 3/2016 | Weiss et al. |
| 2010/0003440 A1* | 1/2010 | Booth .................... B21C 37/124 |
| | | 428/36.91 |
| 2013/0133776 A1* | 5/2013 | Gartner ............... F01N 13/1816 |
| | | 138/137 |
| 2018/0073668 A1* | 3/2018 | Tanaka ....................... B32B 1/08 |
| 2018/0224028 A1 | 8/2018 | Schenk et al. |
| 2019/0010856 A1* | 1/2019 | Gade .................... F16L 51/025 |

FOREIGN PATENT DOCUMENTS

| | | | |
|---|---|---|---|
| DE | 102008001297 | 10/2008 | |
| DE | 102008017465 | 10/2009 | |
| DE | 102011053131 | 5/2012 | |
| DE | 102013200579 | 7/2014 | |
| DE | 102013104446 | 10/2014 | |
| DE | 102013105891 | 12/2014 | |
| DE | 202015104177 | 1/2016 | |
| DE | 102015102258 | 8/2016 | |
| EP | 3 118 504 | 1/2017 | |
| EP | 3118504 A1 * | 1/2017 | ......... F01N 13/1816 |
| WO | WO-2010107995 A2 * | 9/2010 | ............ F16L 11/082 |
| WO | WO 2017/016728 | 2/2017 | |

* cited by examiner

LINE ELEMENT WITH FRICTION-REDUCING LAYER

CROSS-REFERENCES TO RELATED APPLICATIONS

This application is the U.S. National Stage of International Application No. PCT/EP2019/052035, filed Jan. 29, 2019, which designated the United States and has been published as International Publication No. WO 2019/149665 A1 and which claims the priority of German Patent Application, Serial No. 10 2018 102 078.3, filed Jan. 30, 2018, pursuant to 35 U.S.C. 119 (a)-(d).

BACKGROUND OF THE INVENTION

The invention relates to a line element with an inner element and an outer element, which are arranged concentrically to one another. Such line elements are preferably installed in exhaust pipes in motor vehicles and flexibly connect individual, rigid line units to one another.

Vibrations occur in the exhaust tract of motor vehicles and are caused, for example, by unbalanced rotation elements in the engine, turbocharger or in auxiliary units, as a result of the pulsed pressure profiles of the combustion engine, or as a result of the travel movements in combination with bumps in the road surface and their feedback into the chassis. In this regard, line elements, which are also referred to as decoupling elements, have the task of decoupling such vibrations and movements in the exhaust system of motor vehicles. In addition, they compensate for possible installation tolerances.

Known from DE 20 2015 104 177 U1 are various embodiments of line elements which include a tubular inner element and a tubular outer element, with at least one of the hoses normally being gas-tight. Furthermore, WO 2017/016728 A1 discloses line elements in which the contact of inner element and outer element achieves a damping of vibrations, with a friction layer in the contact zone of inner element and outer element acting to reduce wear. The mentioned documents are fully incorporated into the present application by reference.

In view of the above, it is an object of the present invention to provide an alternative construction of a line element that is easy to manufacture and provides good operating behavior with a long service life.

SUMMARY OF THE INVENTION

According to one aspect of the invention, the object is attained by a line element for exhaust pipes and the like, which line element includes the following components:

A tubular inner element.

A tubular outer element which surrounds the inner element and contacts it (during operation) at least locally.

A sliding layer arranged in the contact zone of inner element and outer element upon the inner element, or arranged upon the outer element, or arranged upon both the inner element and the outer element, and which includes or is made of a temperature-resistant anti-friction lacquer.

Advantageous refinements are set forth in subclaims.

The inner element and/or the outer element are in contact with one another preferably at points, linearly, in partial surface contact or in full surface contact. The contact is hereby established in particular during the use of the line element, i.e. for example during decoupling of vibrations between an engine block and an exhaust system. However, normally the contact is established continuously, i.e. also during the resting phases of the line element.

The sliding layer is provided to reduce wear caused by friction and vibration and is characterized in that it has a smaller sliding friction coefficient than the material of the inner element or outer element, on which it is located, in relation to the material of the opposing element. A sliding layer applied on the outside of the inner element has therefore a smaller sliding friction coefficient in relation to the material of the outer element than the inner element. With respect to stainless steel as a friction partner, the sliding friction coefficient of the sliding layer is preferably less than approx. 0.1, less than 0.08, less than 0.06, or less than 0.02. As usual, the sliding friction coefficient $\mu$ is hereby defined as the ratio of sliding friction force FR to normal force FN, with which the friction partners are pressed against each other.

Further optional technical features of the sliding layer involve its stability in the high temperature range between 400 and 800° C., as well as preferably its resistance in the low temperature range between 0 and −50° C. Furthermore, it is advantageously stable under vacuum or under conditions below atmospheric between $P_{abs}$=0 bar and $F_{abs}$ $P_{atm}$ and/or in the overpressure range up to $P_{abs}$=200 bar. Furthermore, the sliding layer is preferably resistant to flammability and to lightly ionized radiation. In contrast to sliding agents or lubricants in liquid or pasty form, there is no creepage in the sliding layer and the application points and their surroundings preferably have no contamination as a result of dust particles. The friction-reducing property is advantageously combined with an extremely high load capacity of 0.1 N/mm to 750 N/mm.

According to the invention, the sliding layer includes a temperature-resistant anti-friction lacquer. The type of temperature resistance depends hereby on the intended use of the line element. In conjunction with exhaust pipes, the sliding layer should preferably withstand temperatures above 400° C., above 600° C., or particularly preferably above 800° C. An "anti-friction lacquer" is understood to relate to a material that is liquid before or during processing, adheres to the surface of the inner element or outer element and cures there (for example through chemical crosslinking). Curing can take place at room temperature or preferably at temperatures between 30 degrees Celsius and 150 degrees Celsius or 150 degrees Celsius and 500 degrees Celsius. After curing, the anti-friction lacquer should adhere to the base with sufficient abrasion resistance and have the desired friction-reducing surface.

The sliding layer (the anti-friction lacquer) may specifically contain or be made of at least one of the following materials: solid lubricant, matrix material, solvent, binding agent, and additives. Examples of the materials include, though not exhaustive:

PTFE; molybdenum disulfide ($MoS_2$), chromium nitride (CrN), titanium dioxide ($TiO_2$), graphite, zinc sulfide, (metal) phosphate, aluminum, aluminum oxide, boron nitride, silanes, silicon, silicon dioxide, tungsten disulfide ($WS_2$), aramid fibers, glass fibers, glass beads, carbon fibers, glass balls, polymer composites, polyamide resins (PAI resin), epoxy resin (PEEK), polyvinyl butyral resin, polyolefins. Particularly preferred additives (solid lubricants) are boron nitride and molybdenum disulfide.

Additives can be provided to improve the sliding layer with regard to hydrophobic and/or, dust-repellent properties, corrosion protection, UV resistance as well as curing time and curing temperature, total hardness, elasticity or oil resistance, grease resistance, solvent resistance such as, for example, butyl glycol acetate, ethyl glycol acetate.

The used solvent depends on the respective type of application and has no influence on the properties of the coating that cures subsequently.

The grain size of the solid lubricants can be measured using scattered light process in a manner known to the artisan.

The used fiber length has a mean fiber length of less than 1000 microns, preferably less than 600 microns. The mean fiber thickness is less than 550 microns, preferably less than 50 microns.

The sliding layer is typically only provided to form the surface of the inner element and/or outer element so as to reduce friction, while it is not load-bearing for the structure of the line element. Accordingly, the sliding layer preferably has a comparably small thickness, which is dimensioned, for example, such that the sliding layer does not wear off during the service life of the line element. For example, the sliding layer can have a thickness of less than 50% of the thickness of the inner element or outer element (depending on where it is applied), preferably less than 20%, less than 10%, or less than 5%. In absolute numbers, the thickness of the sliding layer is typically less than 150 μm, preferably less than 50 μm, or less than 10 μm.

As already mentioned, both a sliding layer on the inner surface of the outer element and a sliding layer on the outer surface of the inner element can be provided so that in the contact zone between inner element and outer element sliding layer rubs on sliding layer. This enables realization of a particularly great reduction in friction. The sliding layers on inner element and outer element can hereby be made of the same materials (e.g. the same anti-friction lacquer) or be made of different materials.

The sliding layer is advantageously applied to the inner element or the outer element only after it has already been finished or produced and, in particular, brought into its final shape.

According to a refinement of the invention, the inner element and/or the outer element can have a non-circular cross section at least in an axial section of the line element. In particular, it can have an oval or multi-cornered or polygonal, multi-radius cross section, with the corners typically being rounded. Furthermore, a non-round inner element/outer element is usually combined with a round outer element/inner element. Due to the out-of-roundness, a point contact, line contact or surface contact can easily be implemented.

The outer element and/or in particular the inner element involves preferably a stripwound hose, in particular a metallic stripwound hose. Such stripwound hoses are known in different embodiments (single-layer, multi-layer, agraffe-shaped, with inner scales and/or outer scales etc.). Typical embodiments are described, for example, in DE 20 2015 104 177 U1.

Furthermore, the inner element and/or in particular the outer element of the line element can be designed as a corrugated bellows, a wound bellows, or a diaphragm bellows. While corrugated bellows are typically produced from a tube by means of internal high-pressure forming in conjunction with a compression operation, wound bellows and diaphragm bellows involve hi the profile area welded, rotationally symmetrical or spiral-wound elements which either have corrugations that are perpendicular to the rotation axis or have spiral corrugations. A wound bellows structure can preferably be form fittingly hooked or overlapping or welded in a material interconnecting manner, Such elements are described, for example, in DE 10 2008 001 297 B1 or DE 10 201 1 053 131 A1.

Furthermore, the outer element and/or the inner element can include or be made of at least one of the following materials: stainless steel, steel, zinc, aluminum alloys, copper, titanium, tantalum, nickel-based alloys, brass and/or bronze.

According to another aspect of the invention, the object is attained by a method for the production of a line element according to one of the afore-described embodiments. The method includes hereby the following steps:

a) winding a metallic band into a stripwound hose, which forms the inner element.

b) provision of an outer element, e.g. a diaphragm bellows.

c) coating (at least) the outside of the mentioned stripwound hose with a sliding layer and/or coating (at least) the inside of the mentioned outer element with a sliding layer, with the coating being applied over the entire surface or/and over part of the surface.

d) coaxial arrangement of the inner element in the outer element.

The step c) of the coating can be carried out chronologically at any phase before, after or during the other steps a), b), d).

When being applied only on the finished inner element or finished outer element, the sliding layer is advantageously not strained by its manufacturing process (strip forming, winding, etc.) and is therefore present in the finished line element without damage. Furthermore, the method enables the sliding layer to be limited to the functionally relevant contact zones, so that the material consumption is limited to what is necessary.

BRIEF DESCRIPTION OF THE DRAWING

In the following, an example of the invention will be explained in more detail with the assistance of the figures. It is shown in.

DETAILED DESCRIPTION OF PREFERRED EMBODIMENTS

Figure 1:
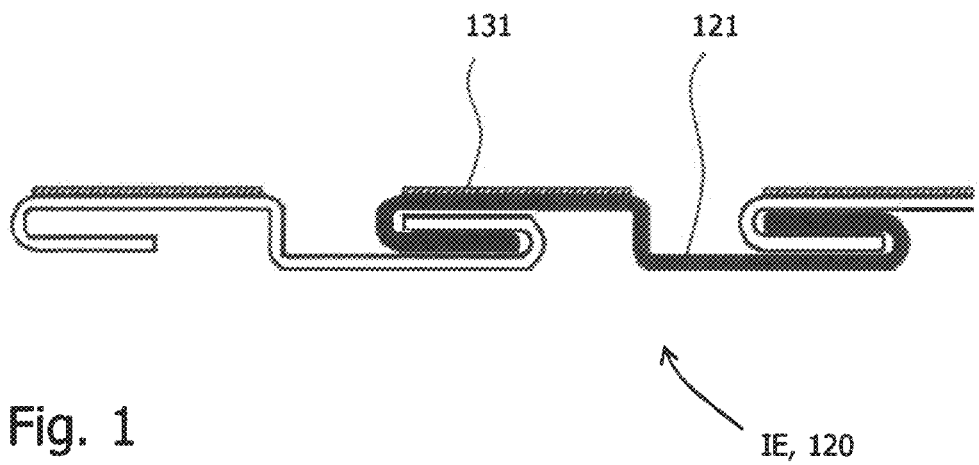
FIG. 1 a longitudinal section through a stripwound hose with a sliding layer in the contact zone.

FIG. 1 shows a longitudinal section through the turns of a metallic stripwound hose 120 which was formed by shaping a metallic band into a profile shape (see turn filled in black in the Figure) and subsequent winding of the profiled strip while hooking into adjacent turns.

The stripwound hose 120 shall be used as inner element IE of a line element 100 for exhaust pipes and for this purpose is coated on the outside with a sliding layer 131 (the stripwound hose could in principle also be used as an outer element and/or as an intermediate hose of a line element formed from more than two coaxial hoses; in this case, other skies may optionally be provided with a sliding layer).

Application of the sliding layer can be realized before profiling and/or before winding the band over the entire surface or partially as well as on one or two sides. The sliding layer 131 is preferably applied after winding of the stripwound hose 120 upon the outside thereof.

The sliding layer 131 can be made in particular of an anti-friction lacquer, for example, though not listed exhaustively, from the anti-friction lacquer of the type Klübertop TP 46-111, Klübertop TM 06-111, Klübertop TG 05, N, OKS 521, OKS 530, OKS 536, OKS 570, OKS 571, OKS 575, OKS 589, OKS 100, OKS 110, OKS 110, OKS 1300, OKS 1301, OKS 1710, OKS 1750, OKS 1765, OKS 510, OKS 511, OKS, Berucoat AF 130, Berucoat AF 291, Berucoat AF 438, Berucoat AF 470, Berucoat AF 481, Berucoat AF 732, Berucoat FX 270, Berucoat AF 991, Berucoat FX 670, Berucoat FX 876, Berucoat AK 376, Berucoat AK 978, Berucoat AF 320 E or theft derivatives.

The thickness of the sliding layer 131 is typically approximately 1 μm to 50 μm. Conversely, the thickness of the metal band 121, from which the stripwound hose 120 is wound, has a value of, for example, approximately 300 μm. With regard to the layer thicknesses in particular, the illustrations are therefore not to be regarded as true to scale.

Figure 2:
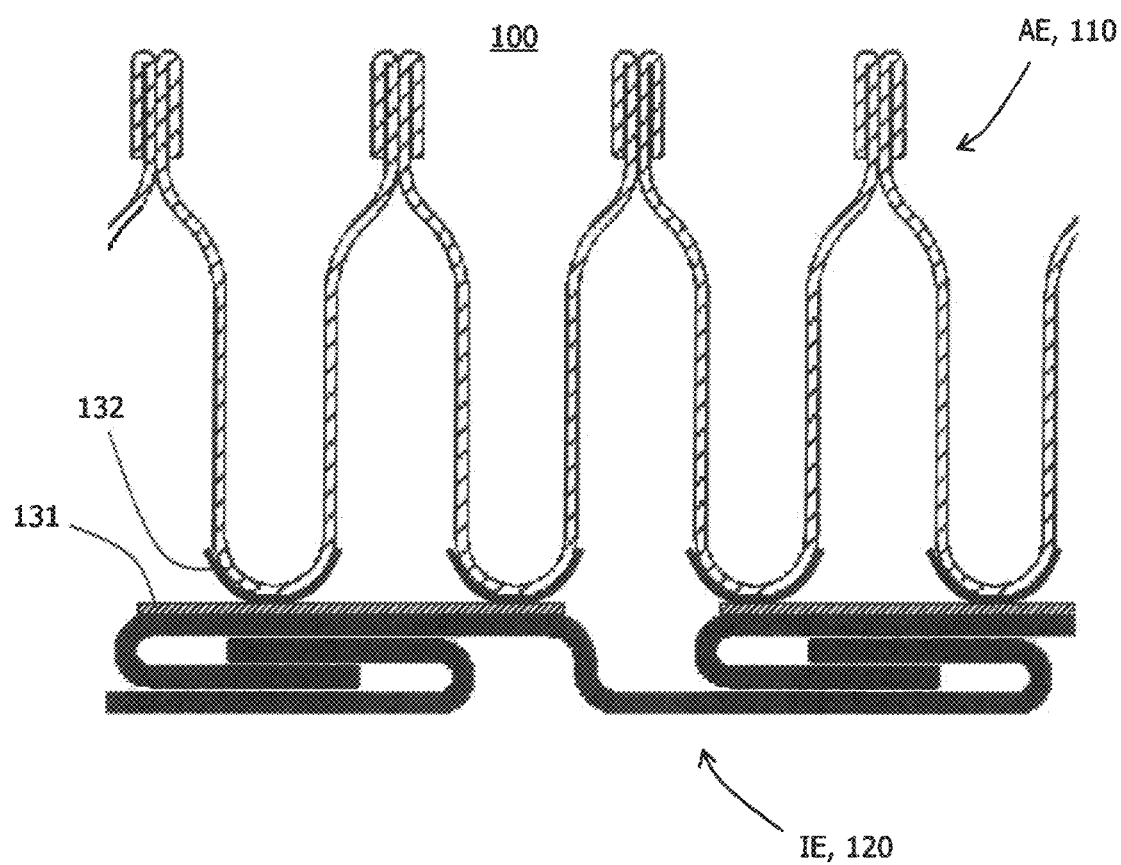
FIG. 2 a section through a wall piece of a line element with a stripwound hose according to FIG. 1 as inner element and a diaphragm bellows with sliding layer as outer element.

FIG. 2 shows a section through the wall of a line element 100, which has been produced as a result of the coaxial arrangement of the stripwound hose 120 of FIG. 1 as inner element IE in a wound diaphragm bellows 110 as outer element AE. Examples of suitable embodiments of the outer element AE can be found in DE 10 2008 001 297 A1, DE 10 201 1 053 131 A1, and DE 10 2013 104 446 A1.

As indicated in the Figure, the outer element AE may also carry a sliding layer 132 in the contact zone with the inner element IE (i.e. the inside of the wave troughs of its turns), so that sliding layer 131 slides on sliding layer 132 during operation. The sliding layer 132 of the outer element AE can be made of the same materials (e.g. anti-friction lacquer) as the sliding layer 131 on the inner element IE, or of other materials. Furthermore, it can be applied to the outer element AE on one or two sides, over the entire surface or partially (as illustrated).

In an alternative embodiment, it is also possible to solely provide the sliding layer 132 on the inside of the outer element AE, while the inner element IE is without a sliding layer.

Figure 3:
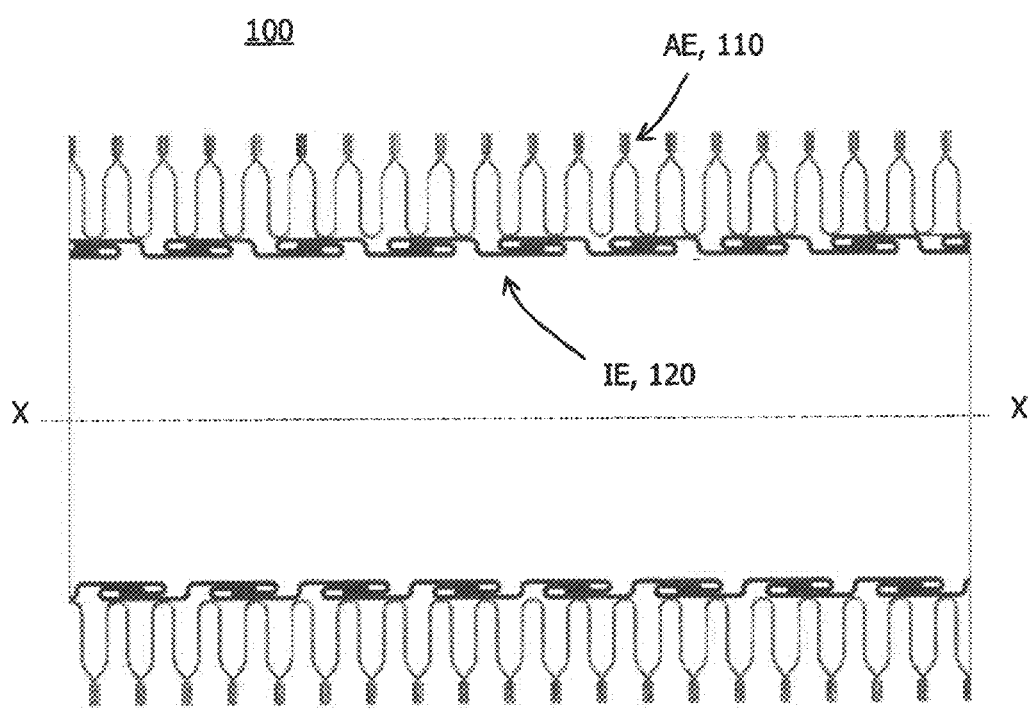
FIG. 3 a section through a line element according to FIG. 2 on a smaller scale.

FIG. 3 shows a section through the line element 100 of FIG. 2 on a smaller scale with both outer walls lying on both sides of the hose axis X-X. Both the outer element AE and that Inner element IE can hereby be rotationally symmetrical to the hose axis, i.e. to have a circular cross section (perpendicular to the drawing plane of FIG. 3).

However, an embodiment is especially preferred in which the inner element IE has a non-round cross-section, in particular an oval cross-section. Further details of such embodiments can be found in DE 10 2015 102 258 A1 or WO 2017/016728 A1.

What is claimed is:

1. A line element for an exhaust pipe, comprising:
   an inner element;
   an outer element in surrounding relation to the inner element such as to contact the inner element in a contact zone; and
   a sliding layer containing a temperature-resistant anti-friction lacquer and arranged in the contact zone on a member selected from the group consisting of the inner element and the outer element,
   wherein the sliding layer contains or is made of at least one material selected from the group consisting of PTFE; titanium dioxide ($TiO_2$), zinc sulfide, (metal) phosphate, aluminum, aluminum oxide, boron nitride, silanes, silicon, silicon dioxide, tungsten disulfide ($WS_2$), polymer composites, polyamide resins (PAI resin), epoxy resin (PEEK), polyvinyl butyral resin, and polyolefins, and
   wherein the sliding layer additionally contains at least one material selected from the group consisting of molybdenum disulfide ($MoS_2$), chromium nitride (CrN), graphite, aramid fibers, glass fibers, glass beads, carbon fibers, and glass balls.

2. The line element of claim 1, wherein the anti-friction lacquer is liquid before or during processing, adheres to a surface of the member, and cures there.

3. The line element of claim 1, wherein the sliding layer includes at least a further agent selected from the group consisting of an organic binding agent, an inorganic binding agent, a solvent, and an additive.

4. The line element of claim 1, wherein the sliding layer has a thickness of less than 30% of a wall thickness of the member on which the sliding layer is located.

5. The line element of claim 1, wherein the sliding layer is applied onto the member, once the member has been finally produced.

6. The line element of claim 1, wherein the inner element is a stripwound hose.

7. A line element for an exhaust pipe, comprising
   an inner element;
   an outer element in surrounding relation to the inner element such as to contact the inner element in a contact zone; and
   a sliding layer containing a temperature-resistant anti-friction lacquer and arranged in the contact zone on a member selected from the group consisting of the inner element and the outer element,
   wherein at least one of the inner element and the outer element has a non-circular cross section at least in an axial section of the line element.

8. The line element of claim 7 wherein the non-circular cross section is an oval or polygonal cross section.

9. A method for the production of a line element, comprising:
   winding a metallic band into a stripwound hose to form an inner element;
   arranging an outer element in surrounding relation to the stripwound hose; and
   coating an outside of the stripwound hose with a sliding layer or coating an inside of the outer element with a sliding layer,
   wherein the sliding layer contains or is made of at least one material selected from the group consisting of PTFE; titanium dioxide ($TiO_2$) zinc sulfide, (metal) phosphate, aluminum, aluminum oxide, boron nitride, silanes, silicon, silicon dioxide, tungsten disulfide ($WS_2$) polymer composites, polyamide resins (PAI resin), epoxy resin (PEEK) polyvinyl butyral resin, and polyolefins, and
   wherein the sliding layer additionally contains at least one material selected from the group consisting of molybdenum disulfide ($MoS_2$), chromium nitride (CrN), graphite, aramid fibers, glass fibers, glass beads, carbon fibers, and glass balls.

10. The method of claim 9, wherein the inner element is arranged coaxially in the outer element.

11. A line element for an exhaust pipe, comprising:
    an inner element;
    an outer element in surrounding relation to the inner element such as to contact the inner element in a contact zone;

a sliding layer arranged on the inner element and containing a temperature-resistant anti-friction lacquer and arranged in the contact zone on a member selected from the group consisting of the inner element and the outer element;

a further sliding layer arranged on the outer element; and wherein the sliding layer contains or is made of at least one material selected from the group consisting of PTFE; titanium dioxide ($TiO_2$), zinc sulfide, (metal) phosphate, aluminum, aluminum oxide, boron nitride, silanes, silicon, silicon dioxide, tungsten disulfide ($WS_2$) polymer composites, polyamide resins (PAI resin), epoxy resin(PEEK), polyvinyl butyral resin, and polyolefins.

12. A line element for an exhaust pipe comprising:

an inner element;

an outer element in surrounding relation to the inner element such as to contact the inner element in a contact zone;

a sliding layer containing a temperature-resistant anti-friction lacquer and arranged in the contact zone on a member selected from the group consisting of the inner element and the outer element;

wherein the sliding layer contains or is made of at least one material selected from the group consisting of PTFE; titanium dioxide ($TiO_2$), zinc sulfide, (metal) phosphate, aluminum, aluminum oxide, boron nitride, silanes, silicon, silicon dioxide, tungsten disulfide ($WS_2$)polymer composites, polyamide resins (PAI resin), epoxy resin (PEEK) polyvinyl butyral resin, and polyolefins, and wherein the outer element is a corrugated bellows, a wound bellows or a diaphragm bellows.

\* \* \* \* \*